United States Patent [19]

Ohkubo et al.

[11] Patent Number: 5,116,356
[45] Date of Patent: May 26, 1992

[54] CONTROL APPARATUS FOR AN INTERNAL COMBUSTION ENGINE

[75] Inventors: Satoru Ohkubo, Amagasaki; Setsuhiro Shimomura, Himeji, both of Japan

[73] Assignee: Mitsubishi Denki K.K., Tokyo, Japan

[21] Appl. No.: 667,510

[22] Filed: Mar. 11, 1991

[30] Foreign Application Priority Data

Apr. 4, 1990 [JP] Japan .................................. 2-91278

[51] Int. Cl.$^5$ .............................................. F02D 43/04
[52] U.S. Cl. ........................................ 123/425; 123/435
[58] Field of Search ............................... 123/425, 435

[56] References Cited

U.S. PATENT DOCUMENTS

| | | | |
|---|---|---|---|
| 4,896,642 | 1/1990 | Washino et al. | 123/435 |
| 4,903,665 | 2/1990 | Washino et al. | 123/435 |
| 4,905,648 | 3/1990 | Washino et al. | 123/425 |
| 4,984,546 | 1/1991 | Shimomura et al. | 123/435 |

FOREIGN PATENT DOCUMENTS

| | | | |
|---|---|---|---|
| 57-59061 | 4/1982 | Japan . | |
| 63-15466 | 4/1988 | Japan . | |
| 63-198751 | 8/1988 | Japan | 123/425 |
| 2-9184 | 2/1990 | Japan . | |
| 2-81942 | 3/1990 | Japan | 123/425 |

*Primary Examiner*—Andrew M. Dolinar
*Attorney, Agent, or Firm*—Sughrue, Mion, Zinn, Macpeak & Seas

[57] ABSTRACT

The inner pressure of cylinder of an internal combustion engine and the crank angle are detected when the engine is in steady state. On the basis of the values as detected, at least one of a fuel quantity or an ignition timing is determined whereby an amount of fuel to be injected to the cylinder or an ignition timing is controlled.

1 Claim, 11 Drawing Sheets

CONTROL APPARATUS FOR AN INTERNAL COMBUSTION ENGINE

BACKGROUND OF THE INVENTION

1. Field of the Invention

The present invention relates to a control apparatus for an internal combustion engine capable of controlling air-fuel ratio and ignition timing of an air-fuel mixture to be supplied to the internal combustion engine.

2. Discussion of Background

FIG. 17 is a schematic illustration showing an example of a control device for a conventional internal combustion engine. As shown in FIG. 17, fuel is sucked from the fuel tank 1 and pressurized in the fuel pump 2, the pulsation of which is stabilized by the fuel damper 3, the particles and the moisture of which are removed by the fuel filter 4, the pressure of which is made constant by the pressure regulator 5 and is supplied to the fuel injection valve 6.

The pressure regulator 5 makes the pressure of the fuel constant. For instance, the pressure of the fuel is made 2.5 kg/cm$^2$ which is the pressure difference between the fuel pressure and a suction pressure of air. The part 7 is a cold start valve which injects fuel and which improves the starting-up of this engine in cold weather.

The quantity of air which passed through the air cleaner 8 is measured by the air-flow meter 9 and regulated by the throttle valve 10. The air passes through the suction manifold 11 and mixed with the fuel by the fuel injection valve 6 and send to each cylinder 12.

The mixture is compressed by the cylinder 12 and ignited by the ignition plug 13 at a pertinent timing.

Exhaust gas is exhausted in the air after it passes through the exhaust manifold 14 and a gas purifying device not shown. The part 40 is an exhaust gas sensor which detects the concentration of the exhaust gas, for instance the oxygen concentration.

The part 15 is a water temperature sensor which detects the temperature of cooling water of the engine. The part 16 is a crank angle sensor of the engine which is incorporated in a distributor. The part 17 is an ignition device. The parts 18 is a control device which controls an air-fuel ratio of the mixture to be supplied to the engine.

The crank angle sensor 16 generates a reference position pulse at every reference position of the crank angle (for example, every 180° in a four cylinder engine and every 120° in a six cylinder engine), and generates a unit angle pulse at every unit angle, (for example every 2°). The crank angle can be shown in the control device 18 by counting the number of every unit pulse after the reference position pulse is generated.

The control device 18 is a microcomputer composed of for instance, a CPU, a RAM, a ROM, an I/O interface and so on. The control device 18 receives a suction air quantity signal S1 from the above-mentioned airflow meter 9, a water temperature signal S2 from the water temperature sensor 15, a crank angle signal S3 from the crank angle sensor 16, an exhaust gas signal S10 from the exhaust gas sensor 40, a battery voltage signal, and a signal indicative of the throttle valve being fully closed although the signals are not shown in FIG. 17. The control device performs a calculation corresponding with these signals and calculates the quantity for fuel injection to be supplied to the engine, or the time of valve opening of the fuel injection valve 6, and outputs a fuel injection signal S5.

By this injection signal S5, the fuel injection valve 6 is put into motion once per every revolution of the engine and a predetermined quantity of fuel is supplied to the engine.

The calculation of a fuel consumption, or a fuel injection time $T_i$ is performed in the above-mentioned control device 18 by, for example, the following equation. This equation is described in a Nissan Technology guide book for 1979 ECCSL engines.

$$T_i = T_p \times (1 + F_t + KMR/100) \times \beta + T_s \qquad (1)$$

In equation (1), $T_p$ is the basic injection quantity or the basic valve opening time and is calculated by the following equation wherein Q signifies the suction air quantity per one revolution, N, the rpm of the engine, and K, a constant.

$$T_p = K \cdot Q/N$$

$F_t$ is a correction coefficient which corresponds to the temperature of the cooling water for the engine. The value is increased as the temperature of the cooling water is decreased, as shown in FIG. 16.

The above-mentioned suction air quantity Q is obtained from the signal S1 of the air-flow meter 9, N, from the signal S3 of the crank angle sensor 16, and $F_t$, from the water temperature signal S2 of the water temperature sensor 15.

KMR is a correction coefficient in case of heavy load time. As shown in FIG. 15, the value is memorized in a data table corresponding with the basic injection quantity $T_p$ and the rpm of the engine N, and is read out from the table.

$T_s$ is a correction coefficient for the battery voltage which is a coefficient to correct the variation of a voltage that drives the fuel injection valve 6. The coefficient is for example, is obtained by the following equation, wherein $V_B$ is the battery voltage and a and b are constants.

$$T_s = a + b(14 - V_B)$$

As shown in FIG. 14, the value increases as the battery voltage decreases.

$\beta$ is a correction coefficient corresponding with the exhaust signal S10 from the exhaust gas sensor 40. By using this $\beta$, the air-fuel ratio of the mixture can be controlled by a feed back control, to a predetermined value, for instance, a value in the neighborhood of a theoretical air-fuel ratio 14.8.

However, when this feed back control by the exhaust signal S10 is carried out, the air-fuel ratio is made always constant, which makes the above-mentioned corrections by the temperature of the cooling water or at the heavy load time meaningless.

Therefore the feed back control by the exhaust signal S10 is carried out, when the correction coefficient $F_t$ for water temperature or the correction coefficient KMR for heavy load time is zero.

Japanese Unexamined Patent Publication No. 59061/1982 discloses a control device for ignition timing of an internal combustion engine. This control device is of an electronic ignition timing control system. As shown in FIGS. 12 and 13, the value of the optimum ignition lead angle corresponding with the rpm of the engine N and the basic injection quantity $T_p$ is memorized in a data table. The control device read out the value which corresponds with the current revolution speed and the basic injection quantity, by looking up the table, and the ignition signal S6 is output to the ignition device 17 and the ignition plug 13 is activated so that the ignition timing is controlled to the above value.

However, in the conventional control device of the internal combustion engine the feed back control is carried out corresponding to the exhaust signal S10 from the exhaust sensor 40 and the correction in heavy load time is determined by the basic injection quantity and the revolutional speed, that is, by the suction air quantity and the revolutional speed, which is carried out by an open loop control.

Therefore, the control value is deviated from the point of LBT by the variation and the timewise change of the air-flow meter 9 or the fuel injection valve 6, and the torque of the engine is lowered and the stability of the engine is worsened as shown in FIG. 9. LBT is the abbreviation of the Leanest Mixture for Best Torque which is an air-fuel ratio that makes the value of the generated torque maximum. This value is different from the air-fuel ratio which is fed back by the aforementioned exhaust gas sensor signal.

Moreover, in the ignition timing control, the conventional control system is an open loop system wherein the ignition timing is read out from the data table memorized beforehand in carrying out the control. Therefore in this system, the ignition timing may be deviated from MBT which is initially matched but changed later by the variation and the timewise change of the engine itself, which causes the lowering of the torque of the engine or generation of knocking as shown in FIG. 10. MBT is the abbreviation of Minimum Spark Advance for Best Torque.

Furthermore, the above-mentioned fuel control and the ignition timing control are separately carried out, and no general control is carried out wherein the above two control systems are interrelated.

As shown in FIG. 11 which is a diagram for air-fuel ratio versus ignition timing characteristic, with respect to the relationship between the air fuel ratio control and the ignition timing control, as a condition which makes the generated torque of the engine maximum, the LMBT shown as a checked point in FIG. 11 realizes both the LBT and the MBT. However in the aforementioned conventional example, the fuel control and the ignition timing control are not interrelated.

Accordingly, the optimum control is not carried out in the conventional technology.

SUMMARY OF THE INVENTION

It is an object of the present invention to provide a control apparatus for an internal combustion engine capable of operating the engine under the conditions of the optimum ignition timing, MBT, and the optimum air-fuel ratio, LBT, having a high efficiency of the engine and a stabilized output of the engine, in spite of the variation and the timewise change of the engine and a change of the environment.

According to an aspect of the present invention, there is provided a control apparatus for an internal combustion engine, which comprises, a pressure detecting means to detect an inner pressure of cylinder, a crank angle detecting means to detect a crank angle, a control device having means for receiving the output signals of said pressure detecting means and said crank angle detecting means for determining data of an inner pressure of cylinder, means for determining a total value or a mean value of said data of said inner pressure of cylinder by using a predetermined number of the data of the inner pressure of cylinder, means for determining at least one of a fuel quantity to be supplied to said engine and an ignition timing of the engine based on said total value or said mean value, and means for renewing the total value or the mean value during the period wherein the engine is in steady state when the predetermined number of the data of the inner pressure of cylinder are being received by said control device, and memorizing the total value or the mean value in a memory, means for stopping said determining of the total value or the mean value of the data when the engine is not in steady state, and means for restarting the determining of the total value or the mean value of the data when the engine recovers in steady state, means for supplying fuel to the engine by the fuel quantity determined by the control device, and an ignition means for igniting the engine at the ignition timing determined by the control device.

DESCRIPTION OF THE PREFERRED EMBODIMENT

Figure 1:
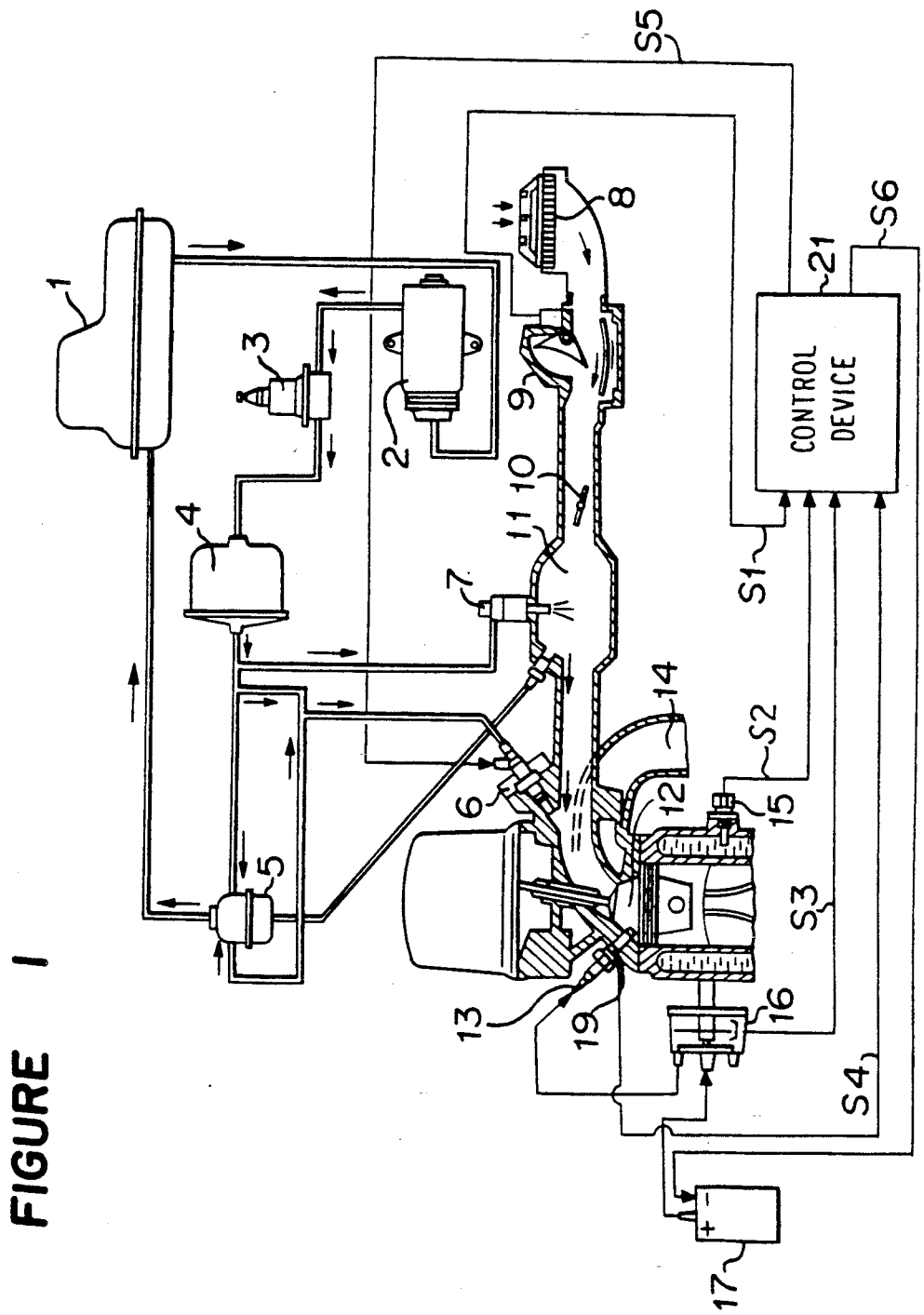
FIG. 1 is a schematic illustration of an embodiment of a control device for an internal combustion engine.

The embodiment of the control device for an internal combustion engine of this invention is to be explained according to the following figures. FIG. 1 is a schematic illustration showing the structure of an embodiment. In FIG. 1, the same numerals are given to the same parts in FIG. 17, and the explanation is not given to the same parts in FIG. 17 and is given to the different parts.

Figure 2:
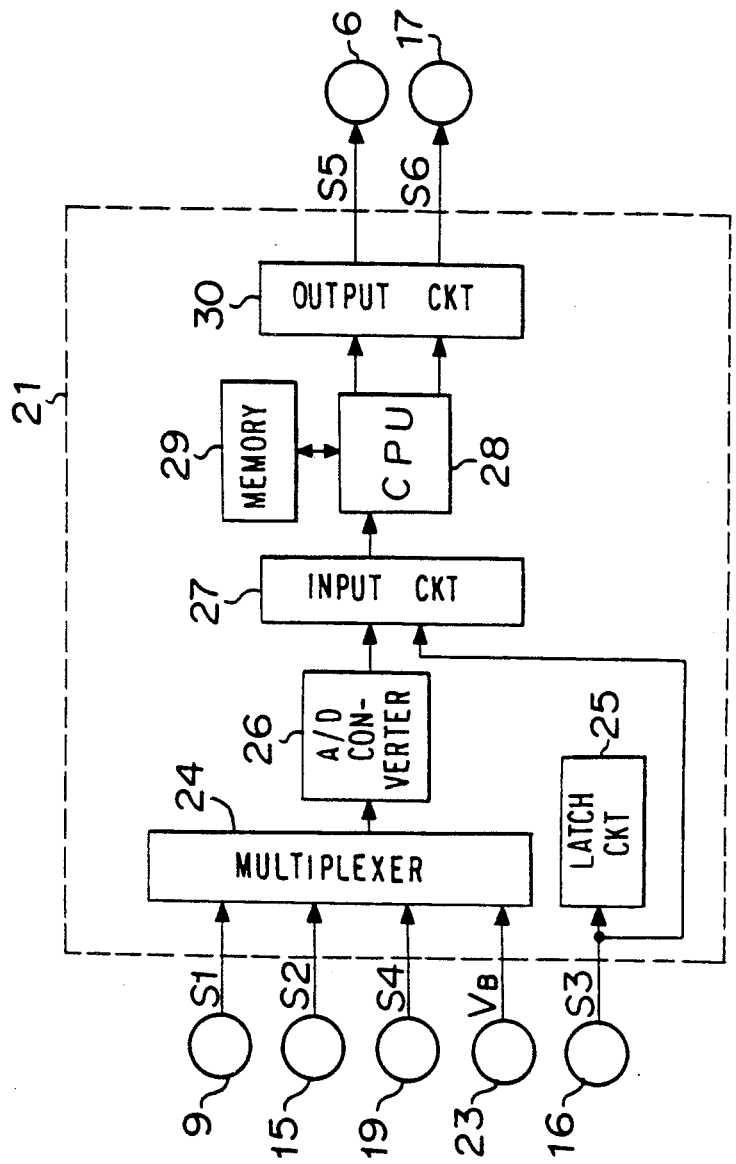
FIG. 2 is a block diagram showing the internal structure of the control device in the embodiment.
Figure 17:
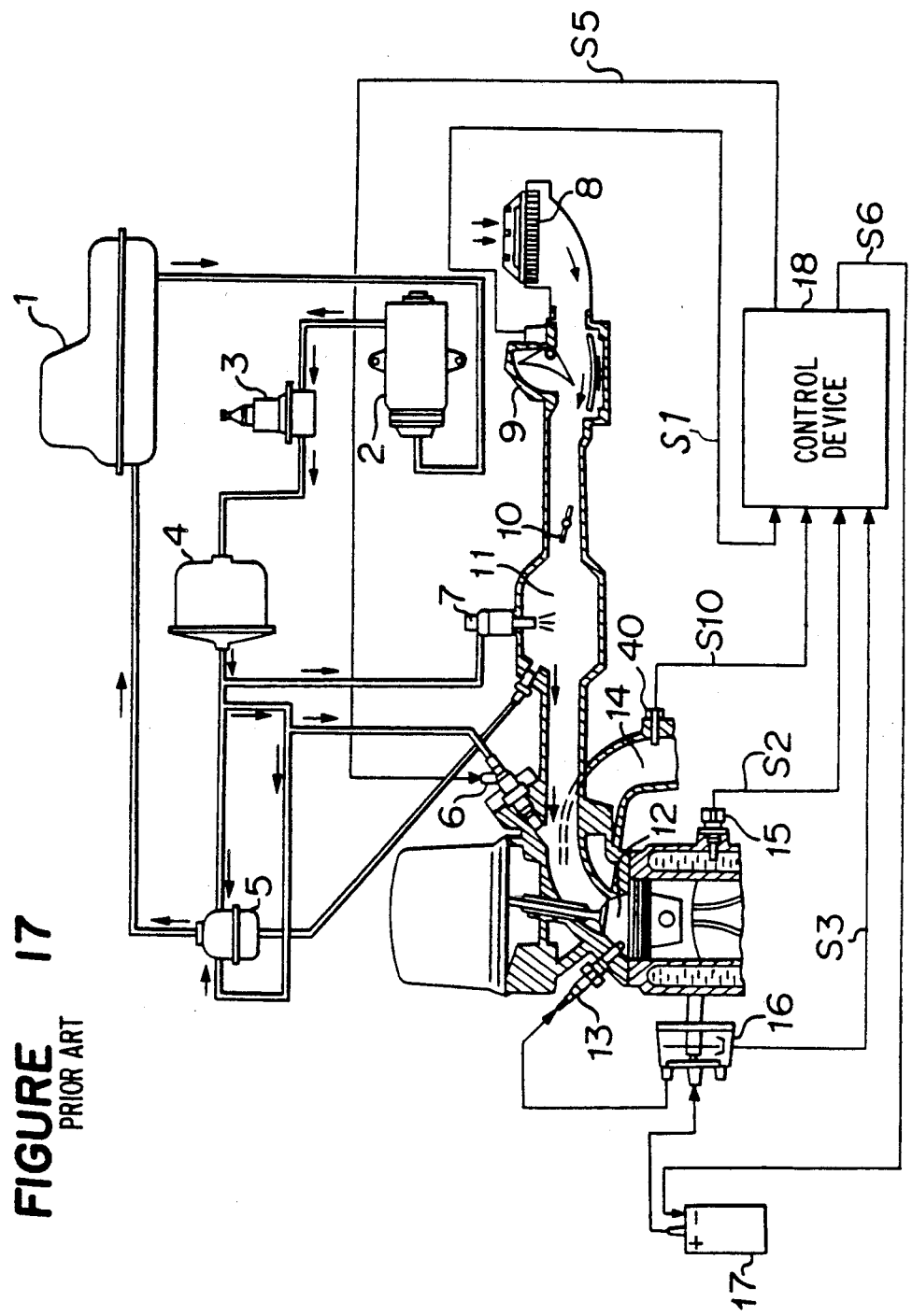
FIG. 17 is a schematic diagram of a control device of a conventional internal combustion engine.

As for the different parts of FIG. 1 compared with FIG. 17, in FIG. 1, the pressure sensor 19 is added, and the control device 21 is different from the control device 18 in FIG. 17. The control device 21 is composed as shown in FIG. 2.

A suction air quantity signal S1 from the air-flow meter 9, a water temperature signal S2 from the water temperature sensor 15, an inner pressure signal of cylinder S4 from the pressure sensor 19, and a voltage signal $V_B$ from the battery 23, not shown in FIG. 1, are to be input to the multiplexer 24 in the control device 21.

A crank angle signal S3 from the crank angle sensor 16 is to be input both to the latch circuit 25 and the input circuit 27.

The input of the multiplexer 24 is switched to each received signal by the output of the latch circuit 25. Each signal is selectively sent to the A/D converter 26. Each signal which is converted to a digital signal by the A/D converter 26 and the crank angle signal S3 from the crank angle sensor 16 are input to the input circuit 27. The output signal from the input circuit 27 is sent to the CPU 28. The CPU 28 performs a calculation shown in a flow chart which is to be explained later.

An injection signal S5 calculated as the result of the calculation, which corresponds to the aforementioned air-fuel ratio control signal, is sent to the fuel injection valve 6 after amplified as for its power by the output circuit 30.

Also an ignition timing control signal S6 which is calculated by the CPU 28 and converted by the output circuit 30, is sent to the ignition device 17.

The part 29 is a memory. The memory 29 is composed of a RAM which temporarily memorizes the calculation by the CPU 28 and a ROM which memorizes beforehand the calculation procedure and various data such as the data table of the aforementioned correction coefficient KMR etc.

Figure 3:
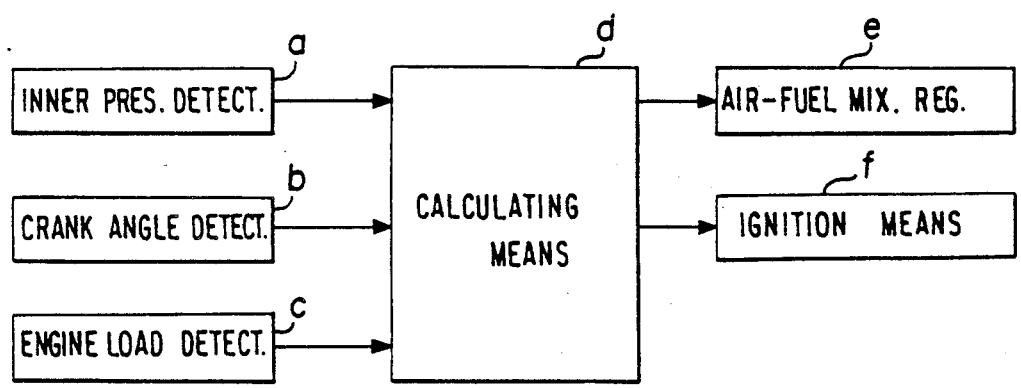
FIG. 3 is a functional block diagram of FIG. 2.

FIG. 3 is a functional block diagram wherein the constituent elements of FIG. 2 are summarized. "a" is a means for detecting inner pressure of cylinder which for instance corresponds to the pressure sensor 19 to be mentioned later. "b" is a means for detecting the crank angle which for instance corresponds to the crank angle sensor 16 as shown in FIGS. 1 and 2.

"c" is a means for detecting the load of an engine which for instance corresponds to the air-flow sensor 9 in FIGS. 1 and 2 mentioned before, or a throttle valve opening sensor not shown which detects the opening of the throttle valve 10.

Furthermore, "d" is a calculating means which for instance is composed of a microcomputer. This calculating means calculates P which represents an inner pressure of cylinder in one ignition cycle from the signals of the detecting means a, b, and c, and calculates T which corresponds to the load of an engine. The calculating means calculates the ratio of P/T, and output an air-fuel ratio control signal which controls the air-fuel ratio so as to make the ratio P/T a maximum.

As for the above-mentioned load T the basic injection quantity $T_p$ can be utilized. The pressure value P is inner pressure of cylinder $P_{mbt}$ at a predetermined crank angle, for instance, at ATDC 15°, or the maximum value of the inner pressure of cylinder $P_m$ or a mean effective pressure $P_i$.

The above-mentioned calculating means d detects the crank angle wherein the inner pressure of cylinder in one ignition cycle is maximized from the signals of detecting means a and b. The calculating means d outputs an ignition timing control signal which controls the ignition timing so that the crank angle is set to a predetermined angle for instance, to ATDC 15° after the top dead point of compression.

Furthermore "e" is a regulating means for an air-fuel mixture. This means controls the mixture to be supplied to an engine corresponding to the air-fuel ratio control signal given by the aforementioned calculating means d. The mixture regulating means e can utilize, for instance, the fuel injection valve 6 as in FIG. 1 or a carburetor which can control the air-fuel ratio by an electric signal, as shown in Japanese Unexamined Patent Publication No. 132326/1976.

"f" in FIG. 3 is an ignition means which makes an ignition in accordance with the ignition timing control signal given by the above-mentioned calculating means d.

As the ignition means f, a full transistor type ignition device consisting of a switching circuit of power transistor and an ignition coil, and the ignition plug 13 can be utilized.

The above-mentioned mean effective pressure $P_1$ is obtained by the following equation.

$$P_1 = \Sigma(P_n + \Delta V)/V.$$

wherein $P_n$ is the inner pressure of cylinder at each crank angle, V, a stroke volume and $\Delta V$, the change of the stroke volume by a certain predetermined angle, for instance 2°.

Since V is constant, the above equation can be approximated into the following equation.

$$P_1 P_1 + \Delta V \cdot P_n$$

The pressure sensor 19 is mounted on the cylinder 12 in FIG. 1. The structure of the pressure sensor 19 is given in FIG. 7A which is a plan, in FIG. 7B which is a cross-sectional view taken along line X—X in FIG. 7A, and FIG. 8 which is a partially cutaway view showing the mounting of the pressure sensor to a cylinder head.

Figure 7A:
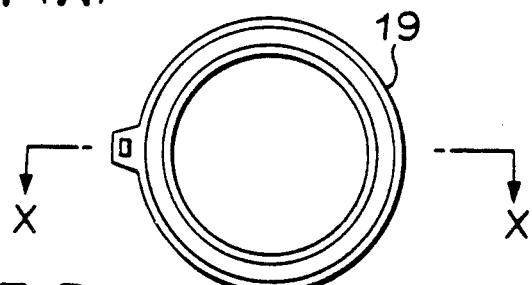
FIG. 7A is a plan of the pressure sensor in the embodiment.
Figure 7B:
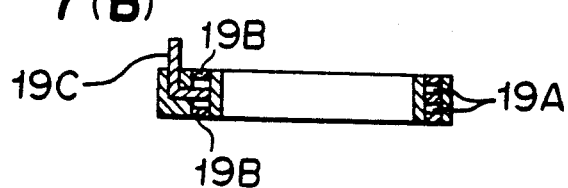
FIG. 7B is a cross-sectional view taken along line X—X in FIG. 7A.

As shown in FIGS. 7A and 7B, the pressure sensor 19 is composed of the ring-like piezoelectric element 19A, the minus electrode 19B, and the plus electrode 19C.

Figure 8:
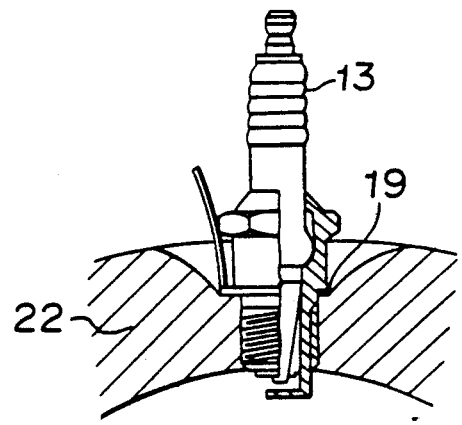
FIG. 8 is a partially cut away view showing the mounting of a pressure sensor to a cylinder head.
Figure 9:
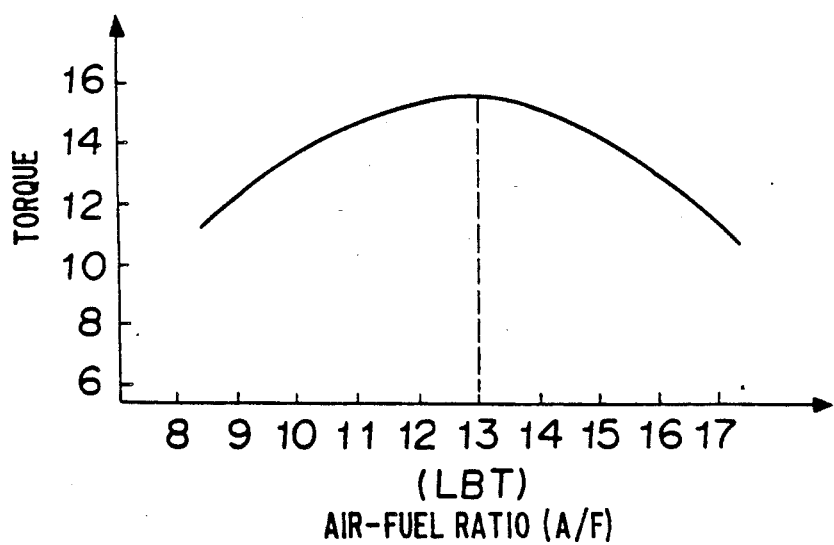
FIG. 9 is a characteristic diagram showing the relationship between an air-fuel ratio and a torque.

This pressure sensor 19, as shown in FIG. 8, is attached to the cylinder head 22 of the cylinder 12 by clamping the pressure sensor 19 with the ignition plug 13 wherein the pressure sensor plays the role of a washer.

Figure 5:
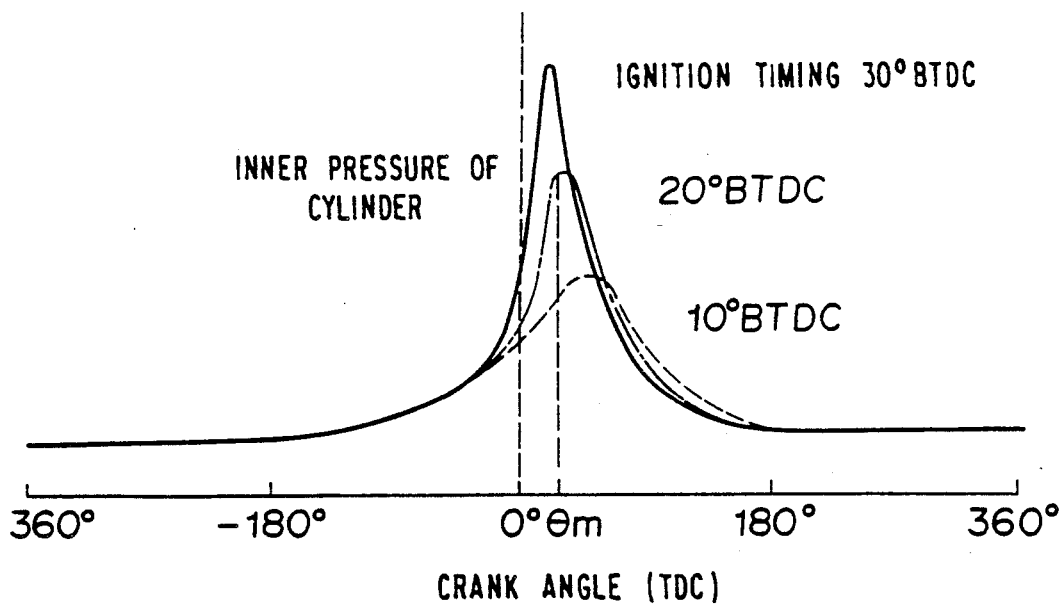
FIG. 5 is a characteristic diagram showing the relationship between a crank angle and an inner pressure of cylinder having a parameter of ignition timing to explain the operation of the embodiment.
Figure 6:
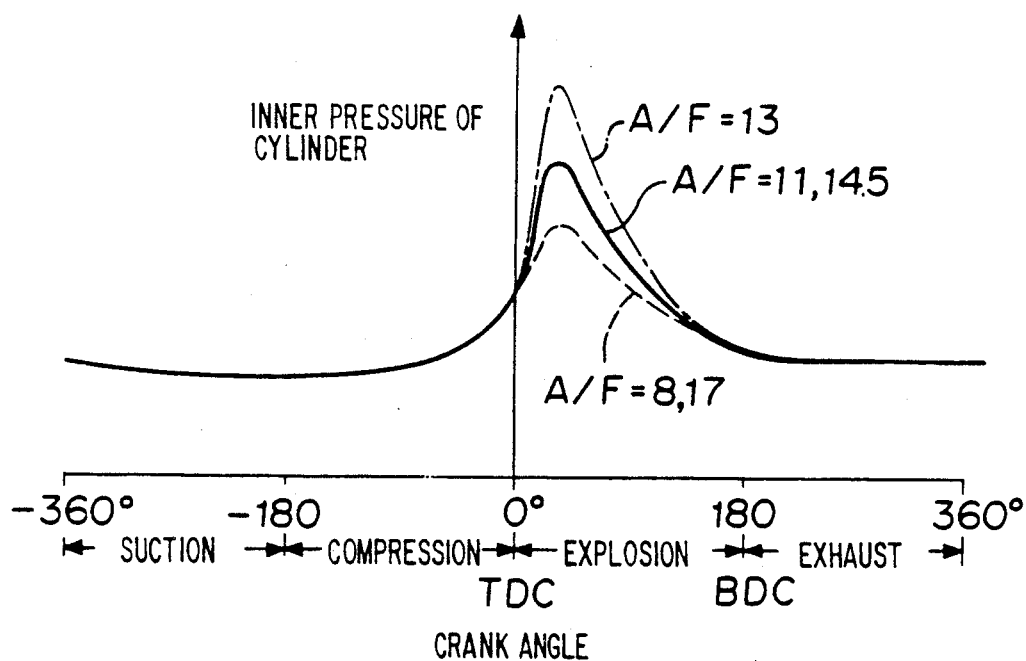
FIG. 6 is a characteristic diagram showing the relationship between the crank angle and the inner pressure of cylinder to explain the operation of the embodiment.

The pressure sensor 19 generates an output which is proportional to the pressure in cylinder as in FIGS. 5 and 6.

Figure 4A:
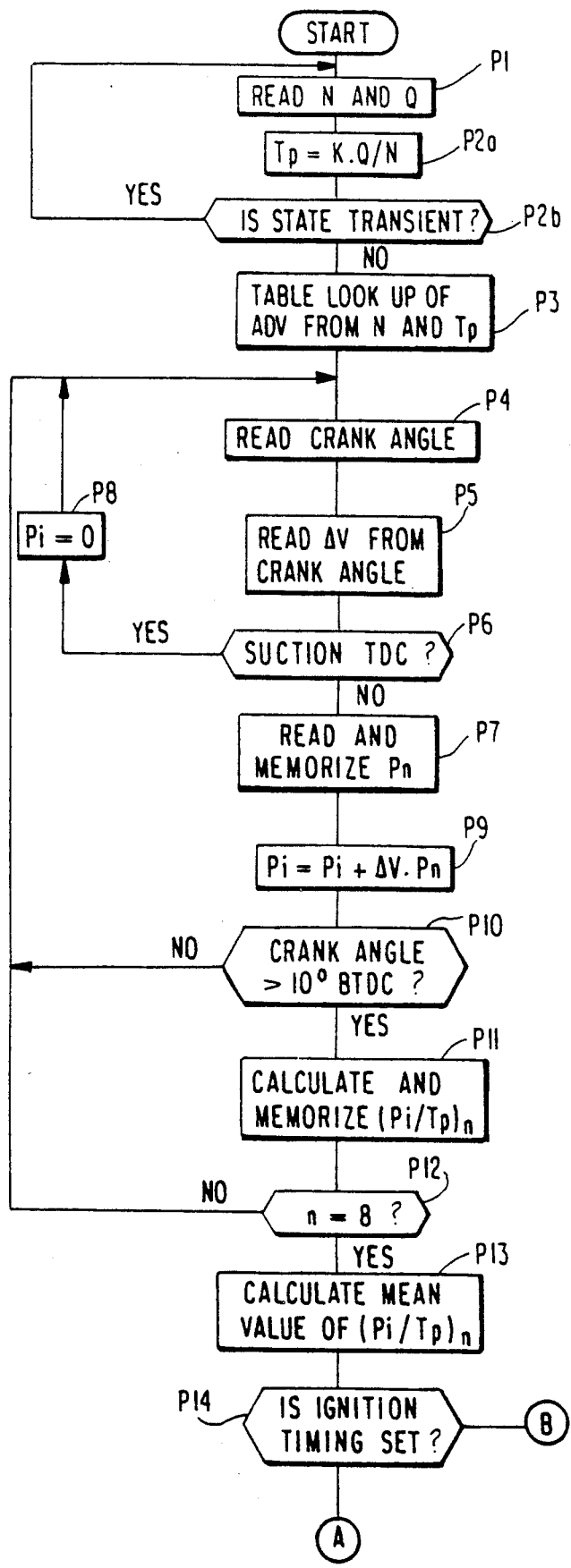
FIGS. 4(A) and 4(B) are a flow chart showing the calculation procedure of the control device.
Figure 4B:
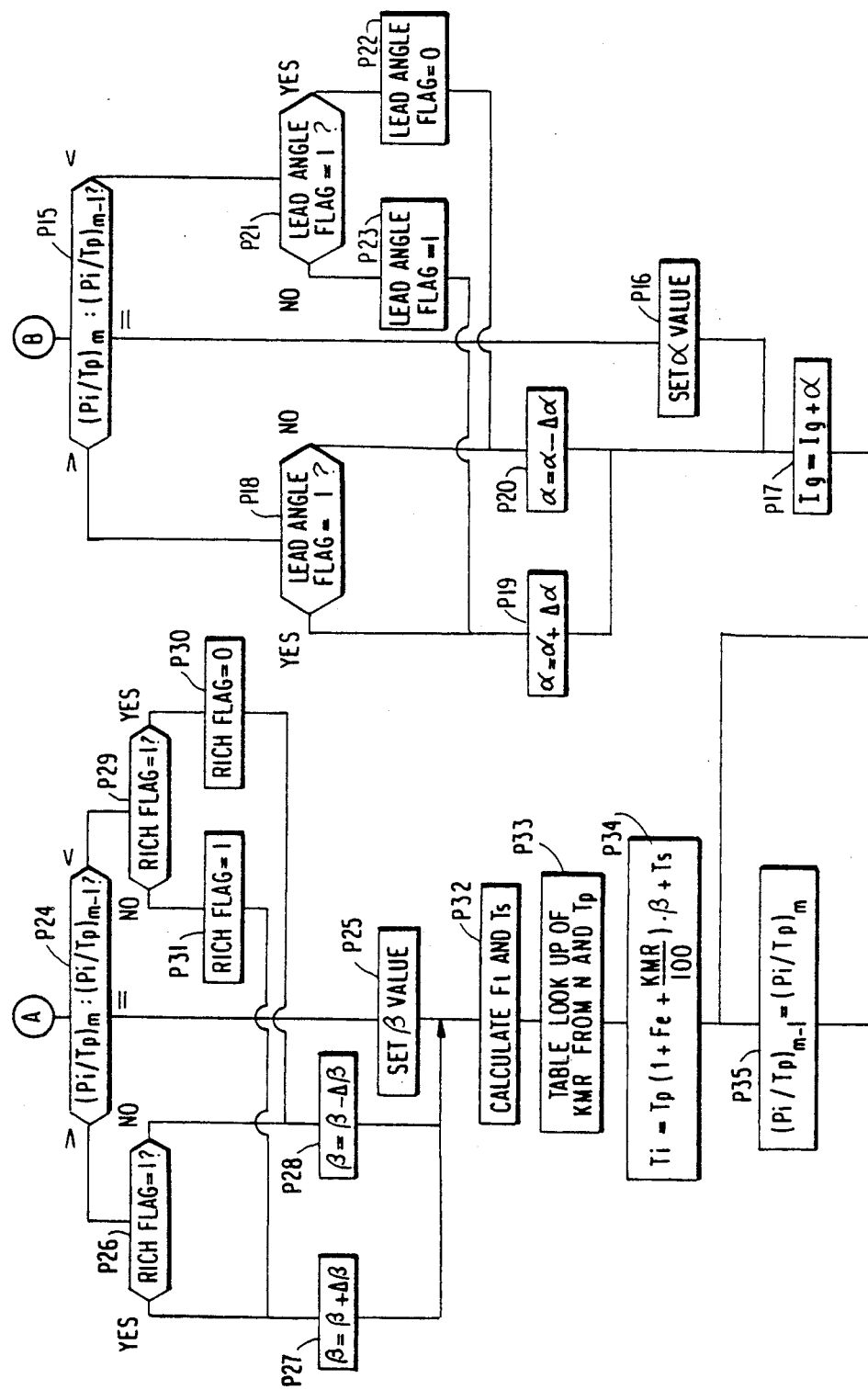

The operation of the invented device is to be explained according to the flow chart in FIG. 4. FIG. 4 is a flow chart which shows a calculation procedure in the above-mentioned control device 21.

In Step P1, the rpm of an engine N is read in from the crank angle signal S3 of the crank angle sensor 16, and the suction air quantity Q is read in from the suction air quantity signal S1 of the air-flow meter 9.

In Step P2a, the basic injection quantity $T_p = K \cdot Q/N$ is calculated, wherein K is a constant, from the read in rpm of an engine N and the suction air quantity Q.

In Step P2b, judgment is given whether the state is transient or not, by comparing the current $T_p$ with a former basic injection quantity.

Figure 13:
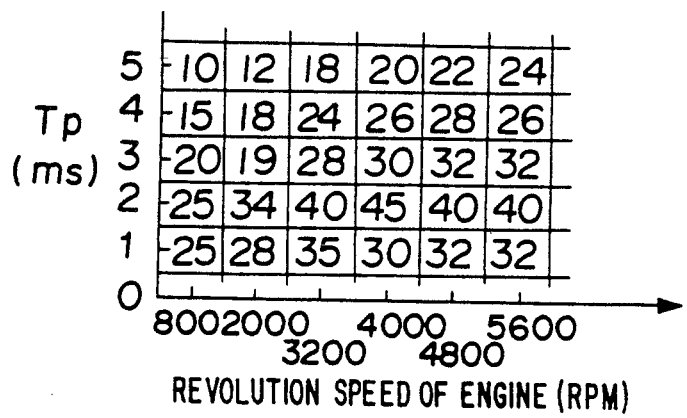
FIG. 13 is a characteristic diagram showing the relationship between the rpm of an engine and a basic injection quantity.
Figure 14:
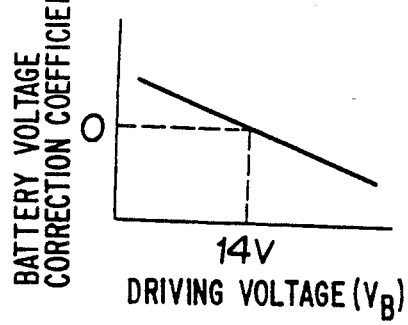
FIG. 14 is a characteristic diagram of a battery voltage correction coefficient showing the relationship between a driving voltage and a battery voltage correction quantity.
Figure 15:
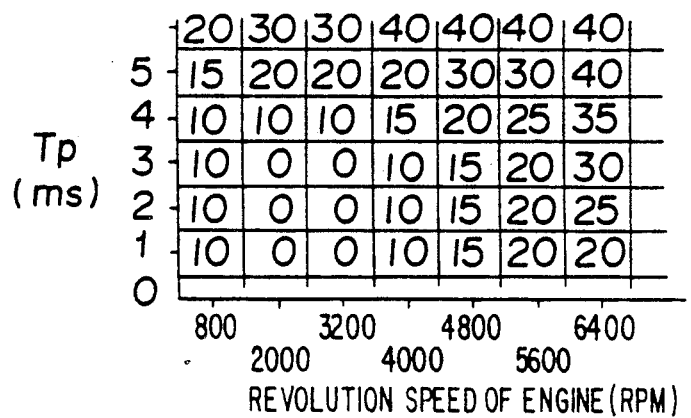
FIG. 15 is a characteristic diagram showing the relationship between the rpm of an engine in heavy load time and a basic injection quantity.
Figure 16:
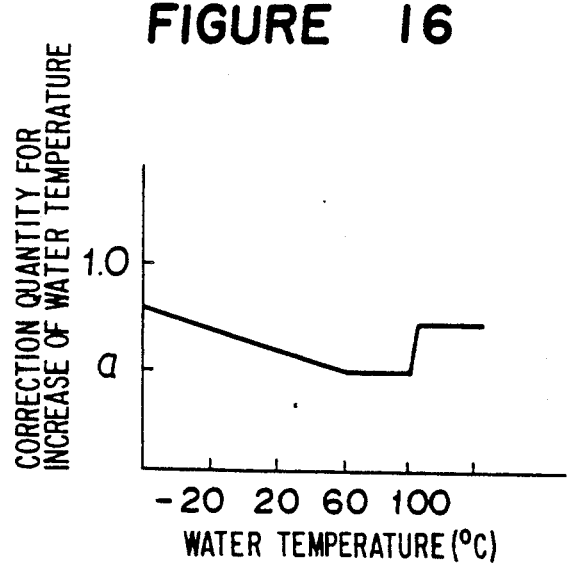
FIG. 16 is a characteristic diagram showing the relationship between a water temperature and a correction quantity for the increase of the water temperature.

When the state is steady, in Step P3, the ignition lead angle value ADV corresponding to the rpm N and the basic injection quantity $T_p$ is looked up from the data table shown in FIG. 13.

When the state is transient, the operation restarts from Step P1 by a next interruption.

In Step P4, the crank angle is read in by the crank angle signal S3 which is generated by the crank angle sensor 16. In Step P5, the change of the stroke volume $\Delta V$ by the change of the crank angle of a certain angle, for instance 2°, from a data table.

In Step P6, a judgment is given on whether the current crank angle is at a top dead point of suction stroke, hereafter TDC, or not.

In this Step P6, when the judgment is NO, Step P7 is started, and the current inner pressure of cylinder $P_n$ is measured from the pressure signal of cylinder S4 of the pressure sensor 19 and memorized.

When the judgment is YES in Step P6, Step P8 is started and the mean effective pressure $P_i$ is reset to zero.

In Step P9, the mean effective pressure $P_i$ is calculated. The mean effective pressure $P_i$ is the value of the work performed by the combustion gas on a piston, divided by the stroke volume, which can approximately be obtained by the following equation, $$P_i = P_i + \Delta V \cdot P_n$$

wherein $\Delta V$ is the change of the stroke volume by the change of each crank angle, for instance, 2°. Therefore the inner pressure of cylinder $P_n$ in the current calculation is multiplied by the change of the stroke volume $\Delta V$ and the product is added to the mean effective pressure $P_i$ which is formally calculated, for instance, at by 2° before in crank angle. Thus the current mean effective pressure $P_i$ is obtained.

In Step P10, a judgment is given whether the crank angle which is read in Step P4 reaches the point just before the top dead point of suction stroke, or the crank angle surpasses BTDC 10°.

The BTDC of 10° is a crank angle assumed to be the end point of the four cycle of an engine, and for instance, BTDC may be 6°.

When the judgment is NO in Step P10, the operation goes back to Step P4, and the foregoing procedure is repeated.

When the judgment is YES in Step P10, the four cycle of an engine is completed, and Step P11 is started. In Step P11, the ratio of the mean effective pressure $P_i$ with the basic fuel injection quantity $T_p$, $(P_i/T_p)_n$, obtained in Step P2, is calculated, and the calculated value is memorized in the memory 29 by the control of the CPU 28.

The suffix n in $(P_i/T_p)_n$ denotes the value in the current calculation of the ignition cycle. In Step P12, a judgment is given whether the value of $(P_i/T_p)_n$ is calculated by a predetermined time or not.

In this example, the predetermined time is set to be eight, and in Step P13, the mean value of eight $(P_i/T_p)_n$ is calculated.

When the number of the calculation does not reach eight, the operation goes back to Step P4 and the reading of crank angle is continued.

When the number of calculation reaches eight, and when a transient state is detected in Step P2b, the mean value calculated by that time is memorized, and the calculation of the mean value is restarted when the crank angle comes back to the same point with that for the former calculation.

Figure 10:
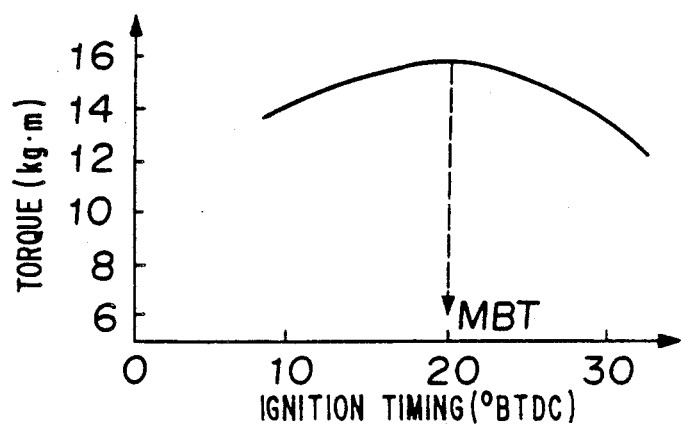
FIG. 10 is a characteristic diagram showing an ignition timing and a torque.
Figure 11:
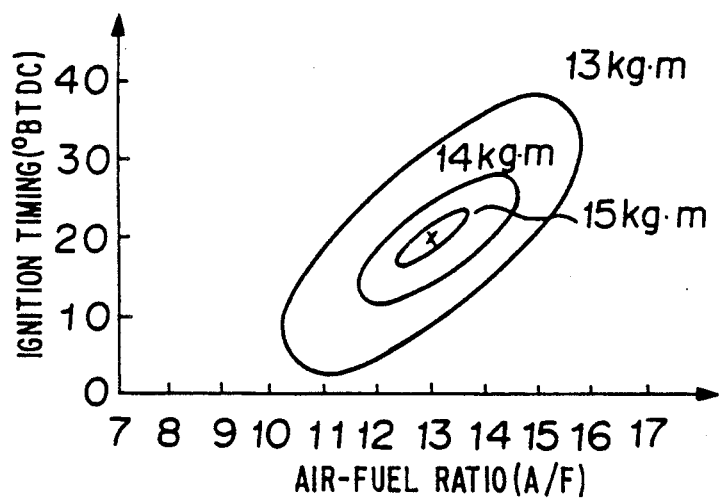
FIG. 11 is a characteristic diagram showing the relationship between an air-fuel ratio and the ignition timing.
Figure 12:
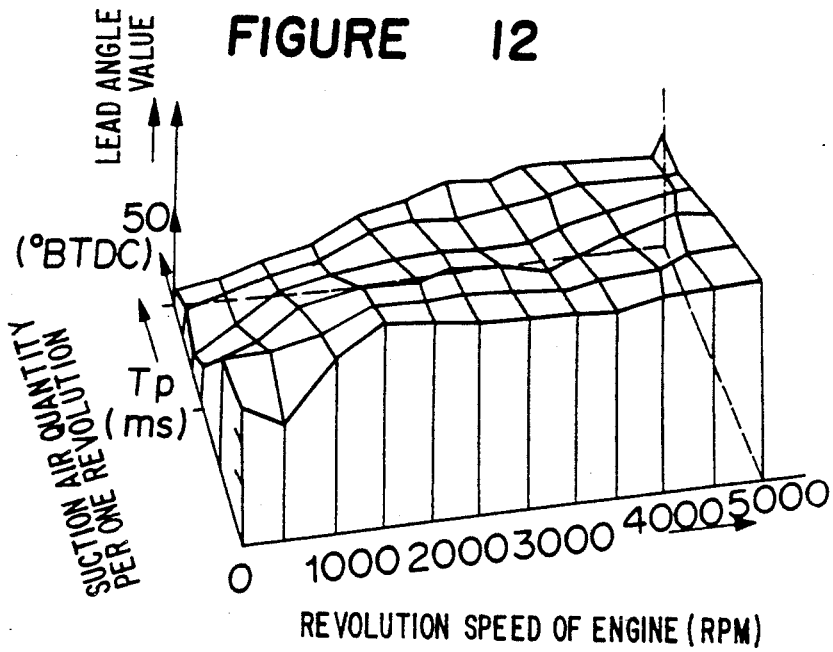
FIG. 12 is a characteristic diagram of an ignition lead angle.

In Step P14, a judgment is made whether an optimum correction control is carried out as for the ignition timing, and whether the optimum ignition timing, hereafter MBT, is set as shown in FIG. 10.

If the judgment is NO, the ignition timing does not reach MBT. In Step P15, a comparison is made between the formerly calculated mean value $(P_i/T_p)_{m-1}$ and the current mean value $(P_i/T_p)_m$. When the above two are equal as the result of the comparison, in Step P16, the value of the former correction coefficient $\alpha$ is written in a data table, and the ignition timing is determined. When the mean value $(P_i/T_p)_m$ in the current calculation is larger than the former one, the correction of the ignition timing is in a right way, and the operation goes to Step 18, wherein a judgment is made whether the lead angle flag is 1 or not.

The lead angle flag is 1 when the ignition timing is corrected to the direction wherein the angle is advanced, and is 0, wherein the ignition timing is corrected in the direction wherein the angle is retarded.

When the judgment is YES in Step P18, that is, when the lead angle flag is 1, the operation goes to P19, the ignition timing correction coefficient $\alpha$ is corrected at in the following equation.

$$\alpha = \alpha + \Delta \alpha$$

Accordingly, the ignition timing is changed in the direction wherein the angle is advanced. FIG. 5 is a characteristic diagram showing the relationship between the crank angle and inner pressure of cylinder having the parameter of the ignition timing. In other words, in FIG. 5, the relationship between the crank angle and the inner pressure of cylinder is shown when the ignition timing is changed.

When the lead flag is not one in Step P18, the operation goes to Step P20, and the ignition timing correction coefficient $\alpha$ is corrected by the following equation.

$$\alpha = \alpha - \Delta \alpha$$

Accordingly, the ignition timing is controlled so that the angle is retarded, that is to say, in FIG. 5, the tendency is reversed.

By the procedures of Step P19 and P20, the ignition timing approaches MBT.

On the other hand, in Step P15, when the current mean value $(P_i/T_p)_m$ is smaller than the former mean value $(P_i/T_p)_{m-1}$, the operation goes to Step P21, and a judgment is made whether the advance angle flag is 1 or not.

When the judgment is YES in Step P21, that is, when the lead angle flag is 1, the operation goes to Step P22. In Step P22, the advance angle flag is made 0, the operation goes to P20. In Step P20, the ignition timing correction coefficient α is corrected by the following equation.

$$\alpha = \alpha - \Delta\alpha$$

Accordingly, when the ignition timing is advanced, and when the mean value $P_i/T_p$ is decreased, as shown in FIG. 5, to make the ignition timing MBT, the ignition timing should be retarded. Therefore, the lead angle flag is made 0 in Step P22 and the ignition timing correction coefficient α is decreased by a certain quantity Δα in Step P20.

When the judgment is NO in Step P21, that is, when the lead angle flag is not one, the operation goes to Step P23. The lead angle flag is made 1 in Step P23 and the operation goes to Step P19. In Step P19, the ignition timing correction coefficient α is corrected by the following equation.

$$\alpha = \alpha + \Delta\alpha$$

In other words, when the ignition timing is retarded, and when the mean value $P_i/T_p$ is decreased, as shown in FIG. 5, to make the ignition timing MBT, the ignition timing should be advanced. The lead angle flag is made 1 in Step P23, and in Step P19, the ignition timing correction coefficient α is controlled so that it increases by a certain amount.

The initial value of the ignition timing correction coefficient α is set to zero when the engine is started.

The above calculation of the ignition timing is carried out until there is no difference between the former mean value $(P_i/T_p)_{m-1}$ and the current mean value $(P_i/T_p)_m$ in Step P15.

In this comparison treatment in Step 15, a certain amount of dead zone is set, and the difference in the range of the dead zone is regarded as zero.

On the other hand, when, in the above Step P14, a judgment is made wherein the ignition timing correction coefficient α is settled, the operation goes to Step P24. In Step P24, to carry out the air-fuel ratio control, a comparison is made between the former mean value $(P_i/T_p)_{m-1}$ and the current mean value $(P_i/T_p)_m$.

The breadth of the dead zone in Step P24 is set to be narrower than that in the dead zone of Step P15.

When a judgment is made wherein there is no difference between these two values as the result of the comparison in Step P24, the operation goes to Step P25. In Step P25, the value of the air-fuel ratio correction coefficient β is set. When the current mean value $(P_i/T_p)_m$ is larger than the former one as the result of the comparison in Step P24, the method of air-fuel ratio correction is in the right way, and the operation goes to Step P26. In Step P26, a judgment is made whether the rich flag is 1 or not. When the rich flag is 1 as the result of the judgment, the operation in Step P29 goes to Step P30, and the rich flag is made 0 in Step P30, and the operation goes to Step P28. In Step P28, the air fuel ratio correction coefficient β is determined by the following equation.

$$\beta = \beta - \Delta\beta$$

Accordingly, when the air-fuel ratio is enriched, and when $P_i/T_p$ is decreased, as shown in FIG. 6 which is a characteristic diagram between the crank angle and the inner pressure of cylinder, to make the engine in the state of LBT, the air-fuel ratio should be made lean.

Accordingly, in Step P30 the rich flag is made 0 and in Step P28, the coefficient β is decreased by a certain amount Δβ.

When a judgment is made wherein the rich flag is not 1 in Step P29, the operation goes to P31. In Step P31, the rich flag is made 1, and the operation goes to Step P27. In Step P27, the air-fuel ratio correction coefficient β is determined by the following equation.

$$\beta = \beta + \Delta\beta$$

Accordingly, when the air-fuel ratio is made lean, and when $P_i/T_p$ is decreased, as shown in FIG. 6, to make the engine in the state of LBT, the air fuel ratio should be enriched. Therefore the rich flag is made 1, and in Step P27, the air-fuel ratio correction coefficient β is controlled to increase by a certain amount Δβ.

Next, in Step P32, the cold temperature correction coefficient $F_t$ is obtained from the water temperature signal S2 of the water temperature sensor 15, and the voltage correction coefficient $T_s$ is calculated from the battery voltage $V_B$ from the battery 23.

Furthermore, in Step P32, the heavy load correction coefficient KMR which corresponds to the rpm of the engine N and the basic injection quantity $T_p$, is looked up from a table.

In Step P34, using the above calculated air-fuel ratio correction coefficient β etc., the fuel injection quantity $T_i$ is calculated by the following equation (2).

$$T_i = T_p \times (1 + F_t + KMR/100) \times \beta + T_s \qquad (2)$$

The initial value of air-fuel ratio correction coefficient β is set to 1 when the engine is started.

In Step P35, for the calculation as for the combustion at the next time, the current calculated value $(P_i/T_p)_m$ is memorized as $(P_i/T_p)_{m-1}$, and the calculation treatment is finished.

The next calculation cycle is started from Step P1 by an interruption.

As explained above, in the calculation of the control device 21 shown in FIG. 4, the ignition timing and the air-fuel ratio are controlled so that the mean effective pressure $P_i$ normalized by the basic injection quantity $T_p$ which corresponds to the load of an engine, is maximized. Accordingly, the optimum ignition timing MBT and the optimum air-fuel ratio LBT are accurately realized.

In FIG. 1, the cylinder 12 is shown to be single. In case of multi-cylinder engines, it is possible to control the ignition timing and fuel injection quantity of each cylinder according to the signal of pressure sensors attached to each cylinder.

As for the method of detection of the load of engine, instead of the air-flow meter, a pressure in a suction pipe or an inner pressure of a cylinder in the compression cycle can be utilized.

The pressure sensors 19 are mounted on each cylinder and the inner pressure of each cylinder is measured. The fuel injection may be corrected in the same manner for all the cylinders.

The correction of the same fuel injection for all the cylinders may be made by the output of the pressure sensor mounted on one of the cylinders.

Furthermore, as a mixture regulating means, instead of the fuel injection valve, a carburetor can be used, and the same control can be realized.

As explained above, according to this invention, the inner pressure of cylinder is detected by a pressure sensor. The mean effective pressure is obtained from the detected value. The value is normalized by the load of an engine. The ignition timing and the air-fuel ratio are controlled by a feed back control system so that the normalized value is maximized. Therefore, in spite of the variation and timewise change of the part of an engine, or in spite of the change in the environment, the engine can be operated under the conditions of the optimum ignition timing MBT and the optimum air-fuel ratio LBT, and the power of the engine which has a high efficiency and stabilize, is obtained.

What is claimed is:

1. A control apparatus for an internal combustion engine, comprising:

pressure detecting means for detecting an inner pressure of a cylinder of the engine, crank angle detecting means for detecting a crank angle of the engine, a control device having means for receiving output signals of said pressure detecting means and said crank angle detecting means to determine data of an inner pressure of the cylinder, means for determining a mean value of said data of said inner pressure of the cylinder by using a predetermined number of the data of the inner pressure of the cylinder, means for determining at least one of a fuel quantity to be supplied to said engine and an ignition timing of the engine based on said means value, and means for renewing said mean value during a period when the engine is in a steady state and when the predetermined number of the data of the inner pressure of the cylinder are being received by said control device, and memorizing said mean value in a memory, means for stopping said determining of the mean value of the data when the engine is not in a steady state, and means for restarting the determining of the mean value of the data when the engine recovers a steady state, means for supplying fuel to the engine in accordance with the fuel quantity determined by the control device, and an ignition means for igniting the engine in accordance with the ignition timing determined by the control device.

* * * * *